(12) United States Patent
Lee et al.

(10) Patent No.: US 11,003,017 B2
(45) Date of Patent: May 11, 2021

(54) POLARIZER PROTECTIVE FILM, POLARIZING PLATE COMPRISING SAME, AND LIQUID CRYSTAL DISPLAY DEVICE COMPRISING POLARIZING PLATE

(71) Applicant: LG CHEM, LTD., Seoul (KR)

(72) Inventors: Hanna Lee, Daejeon (KR); Yeongrae Chang, Daejeon (KR); Hye Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 203 days.

(21) Appl. No.: 15/744,037

(22) PCT Filed: Sep. 13, 2016

(86) PCT No.: PCT/KR2016/010382
§ 371 (c)(1),
(2) Date: Jan. 11, 2018

(87) PCT Pub. No.: WO2017/048077
PCT Pub. Date: Mar. 23, 2017

(65) Prior Publication Data
US 2018/0210288 A1      Jul. 26, 2018

(30) Foreign Application Priority Data

Sep. 15, 2015      (KR) .................. 10-2015-0130359

(51) Int. Cl.
*G02F 1/1335* (2006.01)
*G02B 1/14* (2015.01)
(Continued)

(52) U.S. Cl.
CPC ......... *G02F 1/133528* (2013.01); *G02B 1/08* (2013.01); *G02B 1/14* (2015.01);
(Continued)

(58) Field of Classification Search
CPC . G02B 1/08; G02B 1/14; G02B 5/223; G02B 5/3033; G02F 1/133528; G02F 2201/50; Y10T 428/1041; C09K 2323/031
See application file for complete search history.

(56) References Cited

U.S. PATENT DOCUMENTS

| | | | |
|---|---|---|---|
| 4,920,004 A | | 4/1990 | Bagchi |
| 5,185,074 A | * | 2/1993 | Yokoyama ........ G02F 1/133516 204/484 |

(Continued)

FOREIGN PATENT DOCUMENTS

| | | |
|---|---|---|
| CN | 101253431 | 8/2008 |
| CN | 103026274 | 4/2013 |

(Continued)

OTHER PUBLICATIONS

Office Action of Korean Patent Office in Appl'n No. 10-2016-0118392 dated Aug. 3, 2018.
(Continued)

*Primary Examiner* — Sophie Hon
(74) *Attorney, Agent, or Firm* — Dentons US LLP

(57) ABSTRACT

The present specification relates to a polarizer protective film including a photocurable resin including a multifunctional acrylate-based monomer and an acrylate-based oligomer having an elongation of 5% to 200%; and a dye or a pigment having a maximum absorption wavelength of 580 nm to 610 nm, and a polarizing plate and a liquid crystal display device including the same.

19 Claims, 2 Drawing Sheets

(51) Int. Cl.
  *G02B 5/30* (2006.01)
  *G02B 1/08* (2006.01)
  *G02B 5/22* (2006.01)
(52) U.S. Cl.
  CPC ........... *G02B 5/223* (2013.01); *G02B 5/3033* (2013.01); *C09K 2323/031* (2020.08); *C09K 2323/035* (2020.08); *G02F 2201/50* (2013.01)

(56) References Cited

U.S. PATENT DOCUMENTS

| | | | |
|---|---|---|---|
| 6,824,712 B1* | 11/2004 | Yang | C09B 47/00 252/582 |
| 2002/0039651 A1 | 4/2002 | Murata | |
| 2003/0123127 A1* | 7/2003 | Yamamoto | G02F 1/167 359/296 |
| 2005/0046321 A1* | 3/2005 | Suga | G02B 5/0226 313/112 |
| 2005/0249932 A1* | 11/2005 | Wang | B32B 27/36 428/219 |
| 2007/0231478 A1* | 10/2007 | Watanabe | G02B 1/111 427/162 |
| 2008/0048156 A1* | 2/2008 | Ahn | F21V 9/04 252/587 |
| 2010/0103355 A1 | 4/2010 | Sakamoto et al. | |
| 2010/0321607 A1 | 12/2010 | Utsumi et al. | |
| 2011/0051052 A1* | 3/2011 | Tasaka | C09B 31/043 349/96 |
| 2012/0075568 A1 | 3/2012 | Chang et al. | |
| 2013/0265522 A1 | 10/2013 | Jung et al. | |
| 2014/0124716 A1* | 5/2014 | Lin | G02B 1/04 252/586 |
| 2015/0234097 A1* | 8/2015 | Kang | G02B 1/04 359/483.01 |
| 2016/0047948 A1 | 2/2016 | Kim et al. | |
| 2016/0054481 A1 | 2/2016 | Kim et al. | |
| 2016/0146978 A1 | 5/2016 | Lee et al. | |
| 2016/0161801 A1* | 6/2016 | Watano | G02F 1/133621 349/71 |
| 2016/0272884 A1 | 9/2016 | Kim et al. | |
| 2016/0349573 A1 | 12/2016 | Ohmuro et al. | |
| 2018/0246356 A1* | 8/2018 | Lin | G02F 1/133528 |

FOREIGN PATENT DOCUMENTS

| | | | | |
|---|---|---|---|---|
| CN | 105102490 | 11/2015 | | |
| EP | 1930748 | 6/2008 | | |
| JP | 58203416 A * | 11/1983 | ............ | G02F 1/1335 |
| JP | H10-26704 | 1/1998 | | |
| JP | 2000043175 | 2/2000 | | |
| JP | 2000352613 | 12/2000 | | |
| JP | 2001343519 | 12/2001 | | |
| JP | 2002097383 | 4/2002 | | |
| JP | 2003-036033 | 2/2003 | | |
| JP | 2003207887 | 7/2003 | | |
| JP | 2003248218 | 9/2003 | | |
| JP | 2005-200608 | 7/2005 | | |
| JP | 2005-300984 | 10/2005 | | |
| JP | 2007-004108 | 1/2007 | | |
| JP | 2008-003425 | 1/2008 | | |
| JP | 2008-145480 | 6/2008 | | |
| JP | 2008-239592 | 10/2008 | | |
| JP | 2010-134349 | 6/2010 | | |
| JP | 2010-256768 | 11/2010 | | |
| JP | 2012042537 | 3/2012 | | |
| JP | 2014-041301 | 3/2014 | | |
| JP | 2014-182274 | 9/2014 | | |
| JP | 2015036734 | 2/2015 | | |
| KR | 10-2008-0012147 | 2/2008 | | |
| KR | 10-2011-0077105 | 7/2011 | | |
| KR | 10-2012-0010212 | 2/2012 | | |
| KR | 10-2012-0078435 | 7/2012 | | |
| KR | 10-2013-0072048 | 7/2013 | | |
| KR | 10-2013-0112990 | 10/2013 | | |
| KR | 10-2014-0118873 | 10/2014 | | |
| KR | 10-2014-0118875 | 10/2014 | | |
| KR | 10-2014-0148335 | 12/2014 | | |
| WO | WO-2014035062 A1 * | 3/2014 | ............... | C08K 3/00 |
| WO | 2014-157963 | 10/2014 | | |
| WO | 2014/157964 | 10/2014 | | |
| WO | 2015064864 | 5/2015 | | |
| WO | 2015-098906 | 3/2017 | | |

OTHER PUBLICATIONS

Office Action of Chinese Patent Office in Appl'n No. 201680042412.9 dated Aug. 29, 2019.
Office Action of Japanese Patent Office in Appl'n No. 2017-566627 dated Jan. 22, 2019.
A list of Applicant's pending applications or issued patents, which may be related to the present application, is shown below: U.S. Appl. No. 15/744,035.

* cited by examiner

[FIG. 1]
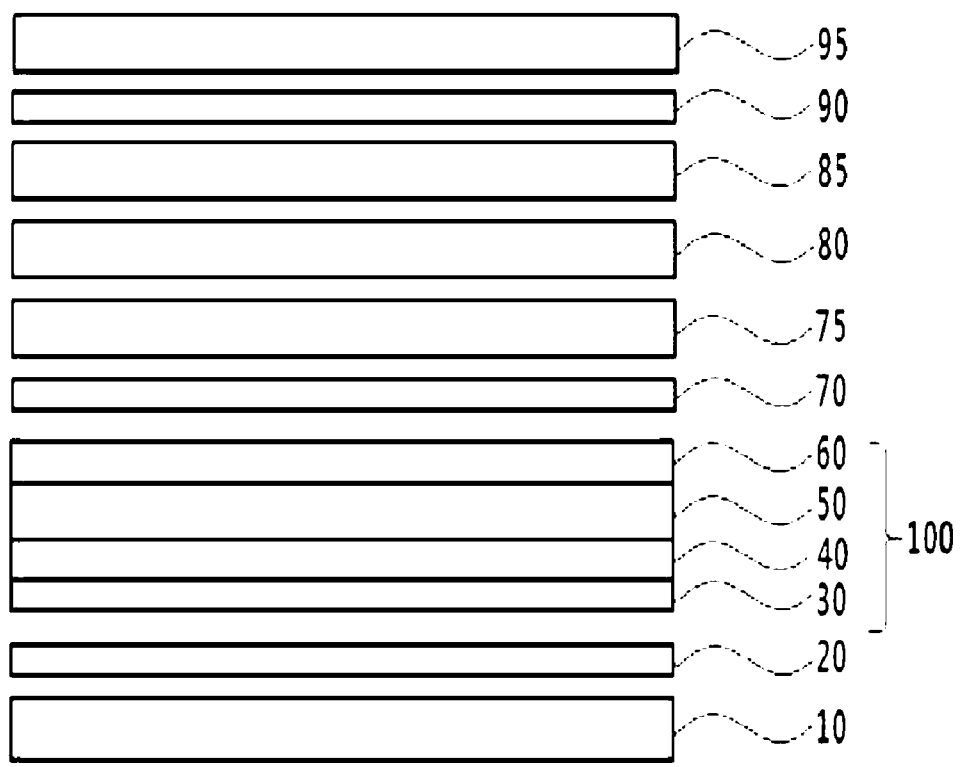

[FIG. 2]
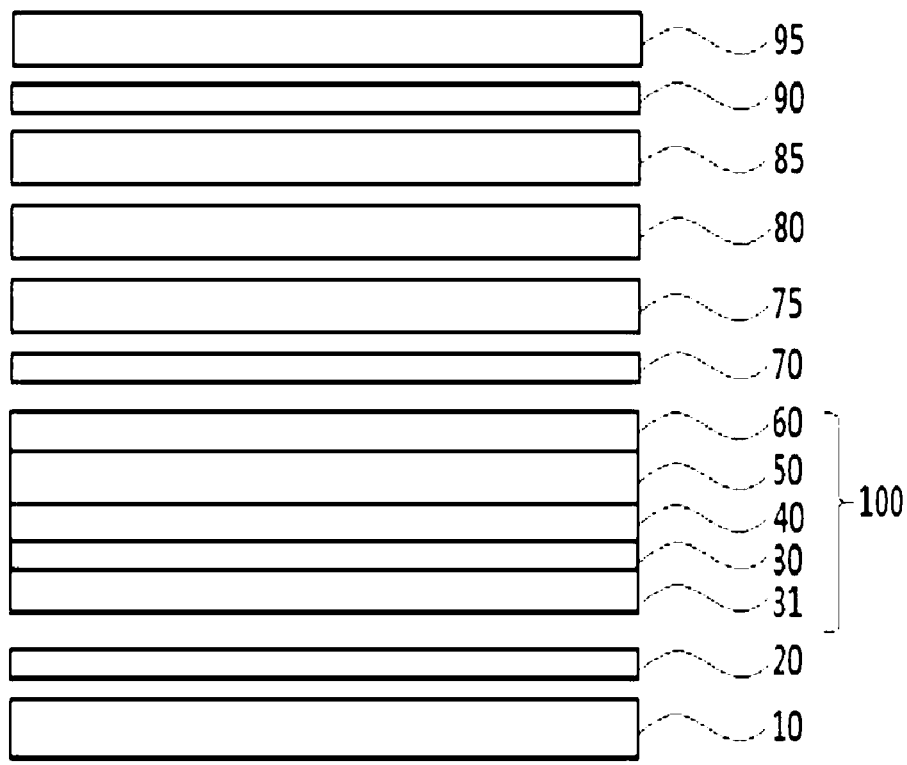

POLARIZER PROTECTIVE FILM, POLARIZING PLATE COMPRISING SAME, AND LIQUID CRYSTAL DISPLAY DEVICE COMPRISING POLARIZING PLATE

TECHNICAL FIELD

This application is a National Stage Application of International Application No. PCT/KR2016/010382 filed on Sep. 13, 2016, which claims priority to and the benefits benefit of Korean Patent Application No. 10-2015-0130359, filed with the Korean Intellectual Property Office on Sep. 15, 2015, both of which are incorporated herein in their entirety by reference for all purposes as if fully set forth herein.

The present specification relates to a polarizer protective film, a method for preparing the same, a polarizing plate including the polarizer protective film, and a liquid crystal display device including the polarizing plate.

BACKGROUND ART

Liquid crystal display (LCD) devices are one of flat displays most widely used currently. Generally, a liquid crystal display device has a structure sealing a liquid crystal layer between a thin film transistor (TFT) array substrate and a color filter substrate. When an electric field is applied to electrodes present on the array substrate and the color filter substrate, an arrangement of liquid crystal molecules of the liquid crystal layer sealed therebetween changes, and an image is displayed using the same.

A liquid crystal display device obtains color images by cutting a specific spectrum of a backlight light source using a color filter, and color purity is affected by characteristics of the light source or the color filter, and further, various constituents such as a polarizing plate or an alignment layer.

Among these, one of the top causes affecting the color purity is light emission spectrum characteristics of the light source irradiating light from the back of a liquid crystal panel. In light emission spectrum distribution of a light source such as a cold cathode fluorescent lamp (CCFL), a hot cathode fluorescent lamp (HCFL) or a light emitting diode (LED), light emission spectra are present between each RGB wavelength as a sub band in addition to wavelength regions corresponding to RGB, and this is color-mixed with a color filter causing decline in the color reproduction. For example, distribution characteristics of light emission spectra of a cold cathode fluorescent lamp (CCFL) has impure light emission spectra near 490 nm and 590 nm that are between dominant wavelengths of each RGB base color, and therefore, light penetrating a color filter produces color mixing causing a problem of narrowing a color reproduction region.

Attempts to improve color reproduction through optimizing a color filter have been made, however, a brightness decrease has become a problem. Accordingly, demands for technology development for improving color reproduction of a liquid crystal display device are still present.

In addition, demands for developing a polarizing plate having sufficient hardness and having a small thickness by replacing a protective film of the polarizing plate so as to be thin, and having sufficient flexibility so as to be suited for a mass production process are still present.

DISCLOSURE

Technical Problem

The present specification is directed to providing a polarizer protective film capable of increasing color gamut and being thinner by replacing a protective film of a polarizing plate, and having no curl or crack occurrences due to excellent flexibility, a polarizing plate including the same, and a liquid crystal display device including the polarizing plate.

Technical Solution

One embodiment of the present specification provides a polarizer protective film including a photocurable resin including a multifunctional acrylate-based monomer and an acrylate-based oligomer having an elongation of 5% to 200%; and a dye or a pigment having a maximum absorption wavelength of 580 nm to 610 nm.

According to another embodiment of the present specification, the polarizer protective film may further include a dye or a pigment having a maximum absorption wavelength present within 480 nm to 510 nm.

According to another embodiment of the present specification, a surface layer provided on one surface of the polarizer protective film may be further included.

According to another embodiment of the present specification, an adhesive layer provided on one surface of the polarizer protective film may be further included.

Another embodiment of the present specification provides a polarizing plate including a polarizer; and the polarizer protective film provided on at least one surface of the polarizer as a protective film.

According to another embodiment of the present specification, the polarizer protective film and the polarizer are adhered through the adhesive layer.

Another embodiment of the present specification provides a liquid crystal display device including a backlight unit; a liquid crystal panel provided on one side of the backlight unit; and the polarizing plate of the embodiment described above provided between the backlight unit and the liquid crystal panel, wherein the polarizing plate is provided such that the polarizer protective film faces the backlight unit.

Another embodiment of the present specification provides a method for preparing a polarizer protective film including coating a composition including a multifunctional acrylate-based monomer, an acrylate-based oligomer having an elongation of 5% to 200%, and a dye or a pigment having a maximum absorption wavelength of 580 nm to 610 nm on a releasing film; forming a polarizer protective film by curing the composition; and peeling off the releasing film from the polarizer protective film.

In another embodiment of the present specification, the method for preparing a polarizer protective film may further include forming a surface layer on the polarizer protective film.

Another embodiment of the present specification provides a method for preparing a polarizing plate including adhering the polarizer protective film described above on at least one surface of a polarizer.

Advantageous Effects

According to a coating composition for a polarizer protective film, a polarizer protective film, a polarizing plate and a liquid crystal display device including the same of the present specification, a polarizing plate and a liquid crystal display device having enhanced color reproduction may be provided by relieving a color mixing phenomenon caused by spectrum characteristics of a backlight and increasing color purity in the liquid crystal display device.

In addition, excellent optical properties can be obtained by preventing a problem of a haze increase caused by a lower protective film of a polarizing plate being damaged due to unevenness of a prism sheet provided at a lower part of the polarizing plate.

Furthermore, the polarizing plate and the liquid crystal display device can be thinner since, with a film of one layer without a separate substrate, a role of a polarizer protective film can be performed as well as obtaining high color reproduction and preventing damages to the lower part of the polarizing plate described above.

Moreover, such an effect can be obtained by applying the present disclosure to a lower polarizing plate of a liquid crystal display device without changing such a color filter or a lamination structure of the liquid crystal display device, and the like, and therefore, production costs can be reduced since excessive process modifications or cost increases are not required.

DESCRIPTION OF DRAWINGS

FIGS. 1 and 2 are each a diagram illustrating a liquid crystal display according to one embodiment of the present specification.

REFERENCE NUMERAL

1: Liquid Crystal Display Device
10: Backlight Unit
20: Prism Sheet
30: Polarizer Protective Film
31: Surface Layer
40: Adhesive Layer
50: Polarizer
60: Protective Film
70: Lower Glass Substrate
75: Thin Film Transistor
80: Liquid Crystal Layer
85: Color Filter
90: Upper Glass Substrate
95: Upper Polarizing Plate
100: Polarizing Plate

MODE FOR DISCLOSURE

Hereinafter, the present disclosure will be described in more detail.

A polarizer protective film of one embodiment of the present specification has a high color reproduction effect capable of increasing color gamut with a film of one layer including a photocurable resin and a dye or a pigment without a separate substrate. Particularly, the polarizer protective film may perform a role of a substrate and a light absorption layer itself, and therefore, is very effective in obtaining a thin device.

One embodiment of the present specification relates to a polarizer protective film including a photocurable resin including a multifunctional acrylate-based monomer and an acrylate-based oligomer having an elongation of 5% to 200%, and a dye or a pigment having a maximum absorption wavelength of 580 nm to 610 nm.

The dye or the pigment has a maximum absorption wavelength present within approximately 580 nm to approximately 610 nm, an orange color region. According to one example, the maximum absorption wavelength of the dye or the pigment is present within approximately 580 nm to approximately 600 nm and specifically within 590 nm to 610 nm.

The dye or the pigment satisfying the above-described condition absorbs unnecessary light particularly in a spectrum region band causing a color mixing problem with a color filter among light entering from a backlight unit including a light source such as CCFL and LED of a liquid crystal display device, and therefore, color reproduction of a display may be significantly enhanced when using a polarizer protective film including the same in a polarizing plate or a liquid crystal display device.

According to one embodiment, as the dye or the pigment, a dye or a pigment experiencing no or small changes in the transmittance of a composition including the dye or the pigment before and after ultraviolet (UV) curing is preferably used. Herein, the changes in the transmittance means changes caused by the dye or the pigment, and components experiencing changes in the transmittance by ultraviolet (UV) curing may be excluded in the composition when measuring the changes in the transmittance. For example, a composition including the dye or the pigment may have changes in the transmittance of less than 5% in a 650 nm to 710 nm region band before and after ultraviolet (UV) curing. Specifically, a composition including the dye or the pigment has changes in the transmittance, which is measured by the following Equation 1, of less than 5%, preferably less than 2% and more preferably less than 1%.

$$\text{changes in transmittance} = \frac{\begin{pmatrix} \text{average light transmittance in} \\ \text{650 nm to 710 nm region} \\ \text{wavelength before } UV \text{ curing} - \\ \text{average light transmittance in 650 nm to} \\ \text{710 nm region wavelength after } UV \text{ curing} \end{pmatrix}}{\text{average light transmittance in 650 nm to}} \times 100 \quad \text{[Equation 1]}$$
$$\text{710 nm region wavelength before } UV \text{ curing}$$

In Equation 1, the ultraviolet (UV) curing means coating a composition including the dye or the pigment on a transparent substrate, and curing the result by ultraviolet rays having a 290 nm to 320 nm wavelength with an irradiation amount of 20 mJ/cm$^2$ to 600 mJ/cm$^2$.

A composition including the dye or the pigment described above has changes in the transmittance of less than 5% in a 650 nm to 710 nm region band before and after UV curing, and the dye or the pigment hardly shows additional absorption peaks in a 650 nm to 710 nm wavelength region band even after UV curing, which is helpful in increasing brightness and enhancing color reproduction.

As such a dye or a pigment, dyes or pigments experiencing almost no changes in the optical properties themselves by ultraviolet (UV) curing as above may be used, or dyes or pigments that have not been used for ultraviolet (UV) curing due to changes in the optical properties such that new absorption peaks are produced in a 650 nm to 710 nm wavelength after ultraviolet (UV) curing through changes in the molecular structure caused by ultraviolet (UV) irradiation may also be used through core-shell type, or surface treatment or surface modification.

Specific examples of the dye or the pigment may include porphyrin derivative compounds, cyanine derivative compounds, squarylium derivative compounds or the like, but are not limited thereto.

According to another embodiment, the polarizer protective film may further include a dye or a pigment having a maximum absorption wavelength within 480 nm to 510 nm. A dye or a pigment having a maximum absorption wavelength within 480 nm to 510 nm absorbs light in a cyan (bluish green color) region, and is capable of further improving color gamut. The dye or the pigment having a maximum absorption wavelength within 480 nm to 510 nm may have a maximum absorption wavelength within 485 nm to 500 nm.

As the dye or the pigment having a maximum absorption wavelength within 480 nm to 510 nm, azo series dye derivatives, coumarin series dye derivatives, fluorescein series dye derivatives, cyanine series dye derivatives, BODIPY series derivatives and the like may be used, however, the dye or the pigment having a maximum absorption wavelength within 480 nm to 510 nm is not limited thereto.

According to one embodiment of the present specification, the photocurable resin is a compound including a photocurable functional group, and includes one or more types selected from the group consisting of multifunctional acrylate-based monomers, multifunctional acrylate-based oligomers, and multifunctional acrylate-based elastic polymers.

According to one embodiment of the present specification, a composition including the dye or the pigment may include a compound including a photocurable functional group.

In a general curing process carried out by ultraviolet rays, optical properties of a dye or a pigment readily change causing a problem of declining optical properties of a film. In addition, although there are no changes in the optical properties caused by ultraviolet rays, a thermosetting resin composition including a dye or a pigment has a problem of not sufficiently satisfying surface hardness and scratch resistance properties as a polarizer protective film and the like. Accordingly, when a thermoplastic resin composition is included in a composition including the dye or the pigment, film hardness may decrease in addition to an adhesion decrease.

However, by including a compound including a photocurable functional group, the polarizer protective film according to one embodiment of the present specification is capable of obtaining excellent color reproduction due to almost no or small changes in the light transmittance before and after ultraviolet curing, and in addition thereto, is capable of effectively protecting a lower polarizing plate due to excellent physical properties such as scratch resistance and high hardness, and therefore, is useful in a polarizing plate for a display that tends to be thinner and larger.

The compound having a photocurable functional group may further include a photocurable monofunctional monomer.

The photocurable monofunctional monomer is not particularly limited, and examples thereof may include amino group-containing monomers such as N-substituted (meth) acrylate or N,N-substituted (meth)acrylate, hydroxyl group-containing monomers such as vinyl acetate or hydroxyalkyl (meth)acrylate, carboxyl group-containing monomers such as (meth)acrylic acid, 2-(meth)acryloyloxyacetic acid, 2-(meth)acryloyloxypropylic acid, 4-(meth)acryloyloxy butylic acid, an acrylic acid dimer, itaconic acid, maleic acid or maleic anhydride, heteroring compounds such as vinyl pyrrolidone or acryloyl morpholine, 2-ureido-pyrimidinone group-containing monomers, and the like. Specific examples thereof may preferably include tetrahydrofurfuryl acrylate (THFA), tetrahydrofurfuryl methacrylate (THFMA), hydroxyethyl acrylate (HEA), hydroxyethyl methacrylate (HEMA), carboxyethyl acrylate, carboxyethyl methacrylate and the like, but are not limited thereto. The photocurable monofunctional monomer may be included in 0 parts by weight to 20 parts by weight based on 100 parts by weight of the photocurable functional group-including compound or binder resin. By being included in 20 parts by weight or less, a decrease in the pencil hardness and the scratch resistance may be prevented.

According to one embodiment of the present specification, the polarizer protective film may have pencil hardness of H or greater under a 500 g load.

Existing compositions including a photocurable resin and a dye have a problem in that stability of the dye is not secured. However, the polarizer protective film according to one embodiment of the present specification is capable of forming a light absorption layer with enhanced stability by including a compound including a photocurable functional group and a dye stable to radicals.

In the present specification, the acrylate-based means, in addition to acrylate, all of methacrylate, or derivatives introducing substituents to acrylate or methacrylate.

The polarizer protective film according to an embodiment of the present specification described above does not include an oriented film, and has a substantially low phase difference value of closer to 0, which is advantageous to be used as a polarizer protective film. In addition thereto, excellent processability and flexibility are obtained, which is advantageous in that the polarizer protective film is capable of being used in large area or curved displays as well.

The multifunctional acrylate-based monomer means including two or more acrylate-based functional groups and has a molecular weight of less than 1,000 g/mol. More specific examples thereof may include hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tetraacrylate (PETA), dipentaerythritol hexaacrylate (DPHA) or the like, however, the multifunctional acrylate-based monomer of the present specification is not limited thereto. The multifunctional acrylate-based monomer performs a role of providing certain strength and abrasion resistance to the protective film by being crosslinked to each other, or crosslinked with an acrylate-based oligomer to be described below.

The multifunctional acrylate-based monomer may be used either alone, or as a combination of different types.

The acrylate-based oligomer is an acrylate having an elongation of 5% to 200%, 5% to 100% or 10% to 50% when measured in accordance with the ASTM D638, and particularly means an oligomer having two or more acrylate functional groups. When the acrylate-based oligomer has an elongation in the above-mentioned range, superior flexibility and elasticity may be obtained without declining mechanical properties. The acrylate-based oligomer satisfying such an elongation range has excellent flexibility and elasticity and forms a curing resin with the acrylate-based monomer, and may provide sufficient flexibility, curl property and the like to the protective film including the same.

According to one embodiment of the present specification, the acrylate-based oligomer may have a weight average molecular weight in a range of 1,000 g/mol to 10,000 g/mol, 1,000 g/mol to 5,000 g/mol or 1,000 g/mol to 3,000 g/mol.

According to one embodiment of the present specification, the acrylate-based oligomer may be an acrylate-based oligomer modified with one or more types of ethylene oxide, propylene oxide or caprolactone. When using the modified acrylate-based oligomer, flexibility is further provided to the acrylate-based oligomer due to modification, and curl property and flexibility of the protective film may increase.

The acrylate-based oligomer may be used either alone or as a combination of different types.

The polarizer protective film of the present specification includes the dye or the pigment described above, and a photocurable resin in which a multifunctional acrylate-based monomer and an acrylate-based oligomer having an elongation of 5% to 200% are cured by ultraviolet rays. In addition, the protective film of the present specification does not include a triacetyl cellulose (TAC) component.

According to one embodiment of the present specification, the multifunctional acrylate-based monomer and the acrylate-based oligomer having an elongation of 5% to 200% may be cured in a weight ratio of 2:8 to 8:2, 3:7 to 7:3 or 4:6 to 6:4 in the photocurable resin. When the photocurable resin is cured in the above-mentioned range, the protective film of the present specification may have sufficient flexibility without mechanical property decline.

The polarizer protective film of the present specification is capable of being highly cured and thinner without optical property decline by including a photocurable resin in which a multifunctional acrylate-based monomer and an acrylate-based oligomer having an elongation of 5% to 200% are cured. In addition, excellent surface hardness and scratch resistance properties are obtained without a separate functional coating layer such as hard coating. Moreover, excellent flexibility and impact resistance may be secured enabling applications in large area or curved displays. In addition, a photocurable resin layer is included instead of an oriented film, and therefore, a phase difference value is substantially low of closer to 0, and as a result, the polarizer protective film of the present specification may be used not only in a film for protecting a polarizer but also in various display devices requiring a low phase difference value without limit in the applications.

By including a photocurable resin in which an acrylate-based oligomer is crosslinking polymerized together with the multifunctional acrylate-based monomer described above, the polarizer protective film according to the present specification may have flexibility while exhibiting high hardness. Accordingly, the polarizer protective film according to the present specification may be used as a multifunctional polarizer protective film by performing a role of a hard coating layer while having a function of a polarizer protective layer without a separate functional coating layer.

According to one embodiment, the polarizer protective film may include the dye or the pigment having a maximum absorption wavelength of 580 nm to 610 nm in 0.01 part by weight to 5 parts by weight and preferably in 0.01 part by weight to 3 parts by weight based on 100 parts by weight of the photocurable resin of the multifunctional acrylate-based monomer and the acrylate-based oligomer. When the dye or the pigment is included in less than the above-mentioned range, an effect of enhancing color reproduction may not be sufficient due to an insignificant light absorption effect, and when included in greater than the above-mentioned range, brightness may decrease and other properties of the coating composition may decline, and the dye or the pigment is preferably included in the above-mentioned parts by weight range.

According to another embodiment, the polarizer protective film may include the dye or the pigment having a maximum absorption wavelength within 480 nm to 510 nm in 0.01 parts by weight to 1 part by weight when a total weight of the photocurable functional group-including compound or binder resin is employed as 100 parts by weight. In the above-mentioned range, the dye or the pigment may further enhance a high color reproduction effect through absorbing light in a 480 nm to 510 nm region, and a brightness decrease may be prevented when the dye or the pigment is included in 1 part by weight or less.

According to another embodiment, the polarizer protective film may further include a photopolymerization initiator in addition to the materials described above. The photopolymerization initiator performs a role of allowing the compound including a photocurable functional group described above to initiate photopolymerization by light irradiation.

As the photopolymerization initiator, those known in the art may be used, and examples thereof may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoyl formate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-oxide or the like, but are not limited thereto. In addition, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F and the like may be included as products currently commercially available. These photopolymerization initiators may be used either alone or as a mixture of two or more types different from each other.

According to one embodiment, the content of the photopolymerization initiator is not particularly limited, however, the photopolymerization initiator may be included in 0.1 part by weight to 10 parts by weight and preferably in 0.1 part by weight to 5 parts by weight when a total weight of the photocurable resin of the multifunctional acrylate-based monomer and the acrylate-based oligomer is employed as 100 parts by weight, in order to accomplish effective photopolymerization without inhibiting properties of the composition for forming the polarizer protective film.

According to one embodiment, the photopolymerization initiator is preferably included in 0.5 parts by weight to 2 parts by weight with respect to 100 parts by weight of the photocurable functional group-including compound or binder resin. When using the photopolymerization initiator within this content range, changes in the spectrum occurring due to dye or pigment deformation caused by photopolymerization initiator radicals may be prevented. Accordingly, it is advantageous in preventing a transmittance increase in a 580 nm to 610 nm region and/or a transmittance decrease in a 650 nm to 710 nm region caused by dye or pigment deformation, which is advantageous in terms of optical durability.

According to one embodiment, the polarizer protective film may be prepared using a method including coating a composition including a multifunctional acrylate-based monomer, an acrylate-based oligomer having an elongation of 5% to 200%, and a dye or a pigment having a maximum absorption wavelength of 580 nm to 610 nm on a releasing film; forming a polarizer protective film by curing the composition; and peeling off the releasing film from the polarizer protective film. As described above, the composition for forming the polarizer protective film may further include a dye or a pigment having a maximum absorption wavelength within 480 nm to 510 nm.

The composition for forming the polarizer protective film may further include the photopolymerization initiator described above.

In addition, the composition for forming the polarizer protective film may further include a solvent. As the solvent, organic solvents may be used, and as the organic solvent, alcohol-based solvents such as methanol, ethanol, isopropyl alcohol or butanol, alkoxyalcohol-based solvents such as 2-methoxyethanol, 2-ethoxyethanol or 1-methoxy-2-propanol, ketone-based solvents such as acetone, methyl ethyl ketone, methyl isobutyl ketone, methyl propyl ketone or cyclohexanone, ether-based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether or diethylene glycol-2-ethylhexyl ether, aromatic solvents such as benzene, toluene or xylene, and the like may be used either alone or as a mixture.

According to one embodiment, the content of the solvent may be controlled diversely within a range that does not decline properties of each of the compositions for forming the polarizer protective film, and is not particularly limited, however, the solvent may be included in 10 parts by weight to 400 parts by weight and preferably in 100 parts by weight to 200 parts by weight with respect to 100 parts by weight of the sum of the multifunctional acrylate-based monomer and the acrylate-based oligomer. Proper fluidity and coatibility are obtained when the solvent is included in the above-mentioned range.

According to another embodiment, the polarizer protective film may further include at least one type of organic particles and inorganic particles. These organic or inorganic particles may be included in the composition for forming the polarizer protective film described above.

By further including the organic or inorganic particles, the polarizer protective film may exhibit an antiglare property through scattering light.

The organic or inorganic particles may have particle diameters of approximately 1 μm or greater in terms of optimizing a light scattering effect, and may have particle diameters of 10 μm or less in terms of obtaining proper haze and coating thickness. More specifically, the organic or inorganic particles may be particles having particle diameters of approximately 1 μm to approximately 10 μm, preferably approximately 1 μm to approximately 5 μm and more preferably approximately 1 μm to approximately 3 μm. When the organic or inorganic particles have particle diameters of less than 1 μm, an antiglare effect obtained by light scattering may be insignificant, and when the particle diameters are greater than 10 μm, the coating thickness needs to be increased to match a proper level of haze, and when the coating thickness increases, cracks may occur.

In addition, the organic or inorganic particles may have a volume average particle diameter of approximately 2 μm to approximately 10 μm, preferably approximately 2 μm to approximately 5 μm and more preferably approximately 2 μm to approximately 3 μm.

The organic or inorganic particles may be used without particular limit in the constitution as long as the particles are types used for forming antiglare films.

For example, the organic particles may use one or more types selected from among organic particles formed with acryl-based resins, styrene-based resins, epoxy resins and nylon resins.

More specifically, the organic particles may be one or more selected from the group consisting of methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, stearyl (meth)acrylate, 2-hydroxyethyl (meth)acrylate, polyethylene glycol (meth) acrylate, methoxypolyethylene glycol (meth) acrylate, glylcidyl (meth) acrylate, dimethylaminoethyl (meth) acrylate, diethylaminoethyl (meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycidyl ether, (meth)acrylic acid, maleic acid, unsaturated carboxylic acid, alkyl (meth) acrylamide, (meth) acrylonitrile and (meth) acrylate, however, the organic particles are not limited thereto.

In addition, as the organic particles, one or more selected from among polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide-based, polyimide-based, polysulfone, polyphenylene oxide, polyacetal, epoxy resins, phenol resins, silicone resins, melamine resins, benzoguamine, polydivinylbenzene, polydivinylbenzene-co-styrene, polydivinylbenzene-co-acrylate, polydiallyl phthalate and triallylisocyanurate polymers, or copolymers of two or more thereof may be used, however, the organic particles are not limited thereto.

In addition, as the inorganic particles, one or more types selected from the inorganic particle group consisting of silicon oxide, titanium oxide, indium oxide, tin oxide, zirconium oxide and zinc oxide may be used, however, the inorganic particles are not limited thereto.

The total content of the organic and the inorganic particles may be in a range of 1 part by weight to 20 parts by weight, preferably 5 parts by weight to 15 parts by weight and more preferably 6 parts by weight to 10 parts by weight, with respect to 100 parts by weight of the photocurable resin of the multifunctional acrylate-based monomer and the acrylate-based oligomer. When the total content of the organic and the inorganic particles is less than 1 part by weight with respect to 100 parts by weight of the photocurable resin of the multifunctional acrylate-based monomer and the acrylate-based oligomer, a haze value obtained by internal scattering is not sufficiently obtained, and when the total content is greater than 20 parts by weight, viscosity of the coating composition increases leading to poor coatibility, and a contrast ratio may decrease since the haze value obtained by internal scattering becomes too large.

According to one embodiment of the present specification, a difference in the refractive index between the organic or the inorganic particles and the photocurable resin of the multifunctional acrylate-based monomer and the acrylate-based oligomer may be from 0.005 to 0.1, preferably from 0.01 to 0.07 and more preferably from 0.015 to 0.05. When the difference in the refractive index is less than 0.005, a proper haze value required for antiglare may not be obtained. In addition, when the difference in the refractive index is greater than 0.1, a contrast ratio may decrease while a haze value increases with an increase in the internal scattering.

According to another embodiment, the polarizer protective film may further include inorganic fine particles as necessary. The inorganic fine particles may be included in a form of being dispersed into the photocurable resin. The inorganic fine particles may be added in the composition for forming the polarizer protective film described above.

As the inorganic fine particles, inorganic fine particles having nano-scaled particle diameters, for example, nano fine particles having particle diameters of 100 nm or less, 10 nm to 100 nm or 10 nm to 50 nm may be included. In addition, examples of the inorganic fine particles may include silica fine particles, aluminum oxide particles, titanium oxide particles, zinc oxide particles or the like. By including the inorganic fine particles, hardness of the protective film may be further enhanced.

According to one embodiment of the present specification, when the protective film further includes the inorganic fine particles, the inorganic fine particles may be included in 1 part by weight to 100 parts by weight, or included in 10 parts by weight to 50 parts by weight when the total weight of the photocurable resin is employed as 100 parts by weight. By including the inorganic fine particles in the above-mentioned range, a protective film having excellent high hardness and flexibility may be provided.

According to another embodiment, the polarizer protective film may further include additives commonly used in the art such as a surfactant, an antioxidant, a UV stabilizer, a leveling agent or an antifouling agent in addition to the above-described components. In addition, the content is not particularly limited since the content may be controlled diversely within a range that does not decline properties of the polarizer protective film or compositions for forming the same, and for example, the content may be from 0.1 parts by weight to 10 parts by weight with respect to 100 parts by weight of the composition for forming the polarizer protective film.

According to one embodiment of the present specification, the polarizer protective film may include, for example, a surfactant as the additive, and the surfactant may be monofunctional to difunctional fluorine-based acrylate, a fluorine-based surfactant or a silicone-based surfactant. Herein, the surfactant may be included in the fort of being dispersed or crosslinked in the photocurable resin.

In addition, the polarizer protective film may include an anti-yellowing agent as the additive, and as the anti-yellowing agent, benzophenone-based compounds, benzotriazole-based compounds or the like may be included.

According to one embodiment of the present specification, the protective film may have a thickness of 10 µm or greater, for example, 10 µm to 200 µm, 10 µm to 100 µm, 10 µm to 50 µm, 10 µm to 40 µm or 10 µm to 30 µm. According to the present specification, the protective film may be prepared to be thinner compared to films including a separate coating layer by having such a thickness, and a protective film having high hardness may be provided without curl or crack occurrences.

According to one embodiment, average light transmittance of the polarizer protective film described above may be 30% or less or 15% or less in a 580 nm to 610 nm wavelength region.

According to another embodiment, average light transmittance of the polarizer protective film described above may be 35% or greater or 50% or greater in a 400 nm to 550 nm wavelength region.

According to another embodiment, a maximum absorption wavelength of the polarizer protective film described above may be in a range of 590 nm to 600 nm.

When the polarizer protective film includes a dye or a pigment having a maximum absorption wavelength within 480 nm to 510 nm, average light transmittance of the polarizer protective film described above may be less than 70% or less than 60% in a 480 nm to 510 nm wavelength region.

Due to a difference in the light transmittance and maximum absorption wavelength characteristics obtained from such a wavelength region band, light in some unnecessary wavelength bands is absorbed among light entering from a backlight unit in a liquid crystal display device to decrease intensity of the light, and a color mixing phenomenon caused by spectrum characteristics of the backlight unit and mismatch with a color filter is relieved, and by increasing color purity, a polarizing plate and a liquid crystal display device with enhanced color reproduction may be provided.

According to another embodiment of the present specification, a surface layer provided on one surface of the polarizer protective film may be further included. According to this embodiment, by being provided with the surface layer, a problem of the dye or the pigment moving to the surface or being smeared out of the surface may be prevented. In addition, functions such as high hardness, scratch resistance, anti-reflection and antiglare may be provided to the surface layer that does not include a dye or a pigment, which is advantageous in terms of selecting materials of the protective film described above or the surface layer.

The surface layer may include a binder resin, for example, a cured material of a compound including a photocurable functional group, and a photopolymerization initiator.

According to one embodiment, the surface layer may be formed by coating an ultraviolet (UV) curable composition on the protective film described above, and photocuring the result. For example, the ultraviolet (UV) curable composition may be a composition including a compound including a photocurable functional group, a photopolymerization initiator and a solvent. As for the coating method and the photocuring, descriptions illustrated above as the method for forming the protective film described above may be used except that the coating is carried out on the protective film described above instead of on the releasing film.

The compound having a photocurable functional group is not particularly limited as long as it is a compound including an unsaturated functional group capable of producing a polymerization reaction by ultraviolet rays, and may be a compound including a (meth)acrylate group, an allyl group, an acryloyl group or a vinyl group as the photocurable functional group.

According to one embodiment, the compound including a photocurable functional group may include one or more types selected from the group consisting of multifunctional acrylate-based monomers, multifunctional acrylate-based oligomers and multifunctional acrylate-based elastic polymers.

As the multifunctional acrylate-based monomer and the multifunctional acrylate-based oligomer, those described as a material of the protective film described above may be used in one, two or more types.

The multifunctional acrylate-based elastic polymer has excellent flexibility and elasticity, and as a polymer including two or more functional groups, may have a weight average molecular weight in a range of approximately 100,000 g/mol to approximately 800,000 g/mol, approximately 150,000 g/mol to approximately 700,000 g/mol or approximately 180,000 g/mol to approximately 650,000 g/mol.

A protective film formed by using a coating composition including the multifunctional acrylate-based elastic polymer may secure high elasticity or flexibility while securing mechanical properties, and may minimize curl or crack occurrences.

According to one embodiment, the multifunctional acrylate-based elastic polymer may have an elongation of 5 to 200%, 5 to 100% or 10 to 50% when measured in accordance with the ASTM D638. When the multifunctional acrylate-based elastic polymer has an elongation in the above-mentioned range, excellent flexibility and elasticity may be obtained without declining mechanical properties.

One example of the multifunctional acrylate-based elastic polymer may include polyrotaxane.

Polyrotaxane generally means a compound in which a dumbbell shaped molecule and a cyclic compound (macrocycle) are structurally fitted. The dumbbell shaped molecule includes a certain linear molecule and a blocking group disposed at both ends of such a linear molecule, and the linear molecule penetrates into the cyclic compound. The cyclic compound may move following the linear molecule, and a breakaway is prevented by the blocking group.

According to one embodiment of the present specification, the polyrotaxane may include a rotaxane compound including a cyclic compound to which a lactone-based compound having an acrylate-based compound introduced at the end bonds; a linear molecule penetrating the cyclic compound; and a blocking group disposed at both ends of the linear molecule to prevent a breakaway of the cyclic compound.

The cyclic compound may be used without particular limit as long as it has a size enough to penetrate or surround the linear molecule, and may include a functional group such as a hydroxyl group, an amino group, a carboxyl group, a thiol group or an aldehyde group capable of reacting with other polymers or compounds. Specific examples of such a cyclic compound may include α-cyclodextrin, β-cyclodextrin, γ-cyclodextrin or mixtures thereof.

In addition, as the linear molecule, compounds having a linear form while having a certain molecular weight or higher may be used without particular limit, and polyalkylene-based compounds or polycaprolactone groups may be used. Specifically, polyoxyalkylene-based compounds including an oxyalkylene repeating unit having 1 to 8 carbon atoms or polycaprolactone groups including a lactone-based repeating unit having 3 to 10 carbon atoms may be used.

Such a linear molecule may have a weight average molecular weight of approximately 1,000 g/mol to approximately 50,000 g/mol. When a weight average molecular weight of the linear molecule is too small, mechanical properties or a self-healing ability of a protective film prepared using the same may not be sufficient, and when the weight average molecular weight is too large, compatibility of a prepared protective film may decrease, or appearance properties or material uniformity may greatly decrease.

Meanwhile, the blocking group may be properly controlled depending on the properties of polyrotaxane prepared, and for example, one, two or more types selected from the group consisting of a dinitrophenyl group, a cyclodextrin group, an adamantane group, a trityl group, a fluorescein group and a pyrene group may be used.

Another example of the multifunctional acrylate-based elastic polymer may include a urethane-based acrylate polymer. The urethane-based acrylate polymer has a form of a urethane-based acrylate oligomer being linked to an acrylic polymer main chain as a side branch.

Among the components of the composition for forming the surface layer, the compound having a photocurable functional group may further include a photocurable monofunctional monomer.

The photocurable monofunctional monomer is not particularly limited, and examples thereof may include amino group-containing monomers such as N-substituted (meth)acrylate or N,N-substituted (meth)acrylate, hydroxyl group-containing monomers such as vinyl acetate or hydroxyalkyl (meth)acrylate, carboxyl group-containing monomers such as (meth)acrylic acid, 2-(meth)acryloyloxyacetic acid, 2-(meth)acryloyloxypropylic acid, 4-(meth)acryloyloxybutylic acid, an acrylic acid dimer, itaconic acid, maleic acid or maleic anhydride, heteroring compounds such as vinyl pyrrolidone or acryloyl morpholine, 2-ureido-pyrimidinone group-containing monomers, and the like. Specific examples thereof may preferably include tetrahydrofurfuryl acrylate (THFA), tetrahydrofurfuryl methacrylate (THFMA), hydroxyethyl acrylate (HEA), hydroxyethyl methacrylate (HEMA), carboxyethyl acrylate, carboxyethyl methacrylate and the like, but are not limited thereto. The photocurable monofunctional monomer may be included in 0 parts by weight to 20 parts by weight based on 100 parts by weight of the photocurable functional group-including compound or binder resin. By being included in 20 parts by weight or less, a decrease in the pencil hardness and the scratch resistance may be prevented.

Among the components of the composition for forming the surface layer, types each illustrated as the components for forming the protective film described above may be used as the photopolymerization initiator and the solvent. However, the surface layer does not include a dye or a pigment, and therefore, the photopolymerization initiator may be used more as necessary compared to the protective film described above without a problem of a stability decrease in the dye or the pigment caused by the photopolymerization initiator content. For example, the surface layer may include the photopolymerization initiator in 0.1 part by weight to 15 parts by weight and preferably in 0.1 part by weight to 10 parts by weight when a total weight of the photocurable functional group-including compound or binder resin is employed as 100 parts by weight.

According to one embodiment, solvents having no erosivity for the protective film may be used as the solvent used in the composition for forming the surface layer. The dye or the pigment smearing from the protective film may be prevented thereby. As the solvent having no erosivity for the protective film as above, protic solvents may be used, and for example, alcohol-based solvents such as ethyl alcohol or butanol, and cellosolve-based solvents such as methyl cellosolve may be used. As necessary, solvents such as ketones having erosivity for the protective film may be mixed thereto and used. Co-using a solvent such as an erosive solvent is advantageous in terms of an effect of interlayer adhesion of the surface layer and the protective film described above.

As necessary, the surface layer may further include materials illustrated to be added in the protective film described above, for example, additives commonly used in the art such as at least one of organic particles and inorganic particles, inorganic fine particles, a surfactant, an antioxidant, a UV stabilizer, a leveling agent or an antifouling agent. As for the types and the content of these additives, descriptions on the protective film provided above may be used.

According to one embodiment, the surface layer has a thickness of approximately 1 μm or greater, and for example, may have a thickness of 1 μm to 10 μm or 1 μm to 5 μm, and proper optical properties and physical properties are obtained within the thickness range as above.

According to another embodiment, the thickness of the surface layer may be from 0.01 to 1 and specifically from 0.03 to 1 with respect to the thickness of the protective film. When the thickness of the surface layer is 0.01 or greater with respect to the thickness of the protective film, a uniform surface layer may be formed, which is advantageous in protecting the protective film, and the value being 1 or less is advantageous in terms of crack resistance of the film.

According to another embodiment of the present specification, an adhesive layer provided on one surface of the polarizer protective film may be further included. This adhesive layer may be used to be adhered to a polarizer. Descriptions on this adhesive layer will be provided below with descriptions relating to a polarizing plate. When the surface layer described above is provided on one surface of the polarizer protective film, the adhesive layer may be provided on a surface of the polarizer protective film opposite to the surface provided with the surface layer.

According to another embodiment, pencil hardness of the polarizer protective film described above may be HB or greater, 1H or greater or 2H or greater under a 500 g load.

According to another embodiment, the polarizer protective film described above may exhibit abrasion resistance such that no scratches are produced when going back and forth 10 times under a 200 g load, a 300 g load or a 400 g load after installing steel wool #0 on a friction tester.

According to another embodiment, as for moisture-heat resistance durability of the polarizer protective film described above, changes in the transmittance is less than 2% in a 594 nm wavelength band after poly wiper wiping before and after storing the film in a thermos-hygrostat for 72 hours under relative humidity of 85% and at 85° C.

Another embodiment provides a method for preparing the polarizer protective film described above. According to one example, the preparation method includes coating a composition including a multifunctional acrylate-based monomer, an acrylate-based oligomer having an elongation of 5% to 200%, and a dye or a pigment having a maximum absorption wavelength of 580 nm to 610 nm on a releasing film; forming a polarizer protective film by curing the composition; and peeling off the releasing film from the polarizer protective film. The composition may further include a dye or a pigment having a maximum absorption wavelength of 480 nm to 510 nm.

The releasing film may be used without limit as long as it is commonly used in the art. According to one embodiment of the present disclosure, the releasing film may be a polyolefin-based film such as a polyester film, a polyethylene film, a polyethylene terephthalate film and a polypropylene film, or a Teflon-based film, and may preferably be a film plating treated with a silicone-based resin, a melamine-based resin or a urea-based resin so as to be readily peeled off. The thickness of the releasing film is not particularly limited, however, releasing films having a thickness of approximately 20 μm to approximately 200 μm may be normally used.

The releasing film may be removed by being peeled off before attaching the protective film to a polarizer after curing the composition. Alternatively, the releasing film may also be removed after being attached to a polarizer to be advantageous for transport and storage.

The method of coating the composition is not particularly limited as long as it is capable of being used in the art, and examples thereof may include a bar coating method, a knife coating method, a roll coating method, a blade coating method, a die coating method, a microgravure coating method, a comma coating method, a slot die coating method, a lip coating method, a solution casting method or the like.

Next, a polarizer protective film may be formed by carrying out a photocuring reaction through irradiating ultraviolet rays on the coated composition. As necessary, the coated surface of the composition is flattened before irradiating the ultraviolet rays, and a drying process for volatizing a solvent included in the composition may be further carried out.

The amount of the ultraviolet irradiation may be, for example, from 20 mJ/cm$^2$ to 600 mJ/cm$^2$ and specifically from 200 mJ/cm$^2$ to 600 mJ/cm$^2$. The light source of the ultraviolet irradiation is not particularly limited as long as it is capable of being used in the art, and examples thereof may include a high pressure mercury lamp, a metal halide lamp, a black light fluorescent lamp and the like.

According to another embodiment, the method for preparing the polarizer protective film described above further includes forming a surface layer on the polarizer protective film. In this case, partial curing or half curing may be carried out instead of full curing in the curing after coating the composition for forming a protective film. Subsequently, after coating the composition for forming a surface layer, the composition for forming a protective film and the composition for forming a surface layer may be fully cured. When the protective film is cured with the surface layer in a partially cured or half cured state, an uncured binder component of the protective film is cured with components of the surface layer, which is advantageous in securing adhesion between the two layers. The amount of ultraviolet irradiation for the partial curing or half curing may be from 50 mJ/cm$^2$ to 200 mJ/cm$^2$. The forming of a surface layer may be carried out before or after peeling off the releasing film.

Another embodiment of the present specification provides a polarizing plate including a polarizer; and the polarizer protective film described above provided on at least one surface of the polarizer. In addition, another embodiment of the present specification provides a method for preparing a polarizing plate including adhering the polarizer protective film described above on at least one surface of a polarizer.

A polarizer has a property capable of extracting only light vibrating in one direction from light entering while vibrating in various directions, and those known in the art may be used. For example, those stretching iodine-absorbed poly vinyl alcohol (PVA) with strong tension may be used as the polarizer. More specifically, the polarizer may be prepared by swelling a PVA film by immersing the film in an aqueous solution, dyeing the swollen PVA film with a dichroic material providing polarizability, stretching the dyed PVA film to arrange the dichroic dye materials side by side in the stretching direction, and calibrating the color of the PVA film gone through the stretching. However, the polarizing plate of the present specification is not limited thereto.

According to one embodiment of the present specification, the polarizer protective film described above may be included in both surfaces of the polarizer, and in addition thereto, the polarizer protective film described above may be provided on any one surface, and a protective film known in the art may be provided on the other surface as necessary.

According to one embodiment of the present specification, the polarizing plate of the present specification may further include an adhesive layer provided between the polarizer and the protective film.

The adhesive layer may include an adhesive for a polarizer having transparency and capable of maintaining a polarizing property of the polarizer. The adhesive capable of being used is not particularly limited as long as it is known in the art. For example, one component or two component polyvinyl alcohol (PVA)-based adhesives, acryl-based adhesives, polyurethane-based adhesives, epoxy-based adhesives, styrene butadiene rubber (SBR)-based adhesives, hot melt-type adhesives or the like may be included, however, the present disclosure is not limited to these examples.

The adhesive layer may have a thickness of 0.1 μm to 10 μm or 0.1 μm to 5 μm, however, the thickness is not limited to these examples.

In addition, the total thickness of the polarizing plate of the present specification may be 45 μm or greater, for example, from 45 μm to 250 μm, from 50 μm to 120 μm or from 50 μm to 100 μm. According to the present specification, high hardness may be accomplished without curl or crack occurrences even with such a small thickness.

For example, according to one embodiment of the present disclosure, the polarizing plate of the present specification may have, when exposed for 24 hours at room temperature and located on a plane, an average distance value of each edge or one side of the polarizing plate separated from the plane being 3 mm or less, 2 mm or less or 1 mm or less.

The polarizing plate of the present specification may have pencil hardness of 1H or greater, 2H or greater or 3H or greater under a 500 g load.

In addition, when inserting and winding the polarizing plate of the present specification in a cylindrical mandrel having a diameter of 15 mm, 12 mm or 5 mm, cracks may not occur.

Furthermore, the protective film provided in the polarizing plate of the present specification may have a plane direction phase difference value of 0 nm to 1 nm, 0 nm to 0.6 nm or 0 nm to 0.5 nm.

As in the embodiment described above, the polarizing plate including the polarizer protective film may be used in various fields as well as in a liquid crystal display device. For example, the polarizing plate including the polarizer protective film may be used in applications of mobile communication terminals, smart phones, other mobile devices, display devices, electronic bulletin boards, outdoor electronic display boards and various display units.

According to one embodiment of the present specification, the polarizing plate may be a polarizing plate for twisted nematic (TN) or super twisted nematic (STN) liquid crystals, or a polarizing plate for a horizontal alignment mode such as in-plane switching (IPS), Super-IPS or fringe field switching (FFS), or a polarizing plate for a vertical alignment mode.

Another embodiment of the present specification provides a liquid crystal display device including a backlight unit; a liquid crystal panel provided on one side of the backlight unit; and the polarizing plate of the embodiments described above provided between the backlight unit and the liquid crystal panel.

According to one embodiment, the liquid crystal display device may further include one, two or more prism sheets between the backlight unit and the polarizing plate including the polarizer protective film.

In the liquid crystal display device, the polarizer protective film including a dye or a pigment described above is located adjacent to a backlight unit, a prism sheet, a diffusion film or DBEF, and damages such as splitting of a polarizing plate may be prevented even when the polarizing plate sags to the backlight unit side with the liquid crystal display device being thinner and larger, and as a result, excellent optical properties may be maintained.

FIG. 1 is a diagram illustrating a liquid crystal display device according to one embodiment of the present disclosure. When referring to FIG. 1, the liquid crystal display device (1) of the present disclosure includes a backlight unit (10); a prism sheet (20) provided on the backlight unit (10); and a polarizing plate (100) laminated on the prism sheet (20).

The backlight unit (10) includes a light source irradiating light from the back of a liquid crystal panel, and types of the light source are not particularly limited, and general light sources for a liquid crystal display device such as CCFL, HCFL or LED may be used.

In the present specification, the term 'upper surface' means a surface disposed so as to face a viewer when a polarizing plate is installed in a device such as a liquid crystal display. The term 'upper' means a direction facing a viewer when a polarizing plate is installed in a device. On the other hand, the term 'lower surface' or 'lower' means a surface or a direction disposed so as to face an opposite side of a viewer when a polarizing plate is installed in a device.

The prism sheet (20) is provided on an upper part of the backlight unit (10). The prism sheet (20) is provided to increase light brightness again since light emitting from the backlight unit (10) has a decrease in the brightness while passing through a light guide plate and a diffusion sheet (not shown in the diagram), and such a prism sheet (20) is provided below a lower polarizing plate. However, the prism sheet (20) includes an unevenness structure, and therefore, a lower protective film of the lower polarizing plate touching the prism sheet (20) is damaged causing a problem of an increase in the haze. However, in the liquid crystal display device of the present specification, such a problem may be prevented by laminating the polarizing plate (100) so that a polarizer protective film (30) including a dye or a pigment adhered to a polarizer (50) of the polarizing plate (100) through an adhesive layer (40) faces the prism sheet (20). As described above, the polarizer protective film (30) is also capable of preventing such a problem of an increase in the haze caused by damages on the lower protective film of the polarizing plate as well as having excellent effects in high color reproduction and thinning without a separate substrate.

In other words, when referring to FIG. 1, on the prism sheet (20), a polarizing plate (100) including a general-purpose protective film (60) provided on one surface of a polarizer (50), and an adhesive layer (40) and a polarizer protective film including a dye or a pigment provided on the other surface is provided.

Herein, a structure laminating the polarizer protective film (30) of the present specification on a lower part of the liquid crystal display device, that is, to face the prism sheet (20) is obtained. With such a lamination structure, a problem of a haze increase caused by the polarizing plate (100) being damaged due to unevenness of the prism sheet (20) is prevented, and excellent optical properties may be obtained.

In addition, as described above, a liquid crystal display device having enhanced color reproduction may be provided by relieving a color mixing phenomenon caused by spectrum characteristics of a backlight and increasing color purity in the liquid crystal display device due to transmittance characteristics obtained from a wavelength of the polarizer protective film (30).

According to another embodiment, a diffusion film, a dual brightness enhancement film (DBEF) (not shown in the drawing) or the like may be further included between the prism sheet (20) and the polarizing plate (100), or between the backlight unit (10) and the prism sheet (20). When a diffusion film or a DBEF film is present between the prism sheet (20) and the polarizing plate (100), the polarizer protective film (30) of the polarizing plate (100) touches the diffusion film or the DBEF film, and even in this case, problems of damages to a lower polarizing plate caused by the diffusion film, the DBEF film or the like and an increase in the haze may be equally prevented.

According to another embodiment, a surface layer (31) may be further provided on a surface of the polarizer protective film (30) facing the prism sheet (20) (FIG. 2).

Layers provided on an upper part of the polarizing plate (100) are in accordance with general liquid crystal display device structures, and although a structure of consecutively laminating a lower glass substrate (70), a thin film transistor (75), a liquid crystal layer (80), a color filter (85), an upper glass substrate (90) and an upper polarizing plate (95) is illustrated in FIG. 1, the liquid crystal display device of the present specification is not limited thereto, and structures in which some of the layers illustrated in FIG. 1 are modified or excluded as necessary, or other layers, substrates, films, sheets and the like are added may all be included.

Hereinafter, workings and effects of the present specification will be described in more detail with reference to specific examples of the present specification. However, such examples are for illustrative purposes only, and the scope of a right of the present disclosure is not defined thereby.

EXAMPLE

Example 1

A coating solution was prepared by mixing 50 g of trimethylolpropane triacrylate (TMPTA), 20 g of DPCA120 (Nippon Kayaku Co., Ltd., caprolactone-modified hexafunctional acrylate, elongation measured in accordance with ASTM D638 12%, Mw 1,950), 30 g of PU3400 (Miwon Commercial Co., Ltd., ethylene oxide-modified trifunctional acrylate, elongation measured in accordance with ASTM D638 20%, Mw 2,500), 0.2 g of a porphyrin-based dye having a maximum absorption wavelength of 593 nm, 2 g of a photopolymerization initiator (product name: Darocur TPO) and 10 g of a methyl ethyl ketone (MEK) solvent. The coating solution was bar coated on a PET releasing film. This was dried for 2 minutes at 60° C., and then irradiated by black UV with irradiation intensity of 600 mJ/cm$^2$ under nitrogen atmosphere to obtain a protective film having a thickness of 25 μm.

Example 2

A coating solution was prepared by mixing 50 g of trimethylolpropane triacrylate (TMPTA), 20 g of DPCA120, 30 g of TA604AU (NOF Corporation, ethylene oxide-modified trifunctional acrylate, elongation measured in accordance with ASTM D638 49%, Mw 2,300), 0.2 g of a porphyrin-based dye having a maximum absorption wavelength of 593 nm, 2 g of a photopolymerization initiator (product name: Darocur TPO) and 10 g a methyl ethyl ketone (MEK) solvent. The coating solution was bar coated on a PET releasing film. This was dried for 2 minutes at 60° C., and then irradiated by black UV with irradiation intensity of 600 mJ/cm$^2$ under nitrogen atmosphere to obtain a protective film having a thickness of 25 μm.

Example 3

A coating solution was prepared by mixing 50 g of C150 (product in which 20 nm SiO$_2$ is dispersed into trimethylolpropane triacrylate (TMPTA) of Nano resin in 50 weight %, SiO$_2$ 25 g), 20 g of PU3400, 30 g of TA604AU, 2 g of a photopolymerization initiator (product name: Darocur TPO), 0.2 g of a dye PD-319 (Mitsui Chemical Inc.) and 10 g of a methyl ethyl ketone (MEK) solvent. The coating solution was bar coated on a PET releasing film. This was dried for 2 minutes at 60° C., and then irradiated by black UV with irradiation intensity of 600 mJ/cm$^2$ under nitrogen atmosphere to obtain a protective film having a thickness of 25 μm.

Example 4

A coating solution was prepared by mixing 50 g of trimethylolpropane triacrylate (TMPTA), 20 g of DPCA120 (Nippon Kayaku Co., Ltd., caprolactone-modified hexafunctional acrylate, elongation measured in accordance with ASTM D638 12%, Mw 1,950), 30 g of PU3400 (Miwon Commercial Co., Ltd., ethylene oxide-modified trifunctional acrylate, elongation measured in accordance with ASTM D638 20%, Mw 2,500), 0.2 g of a porphyrin-based dye having a maximum absorption wavelength of 593 nm, 0.06 g of a dye FDB-007 having a maximum absorption wavelength of 493 nm (Yamada Chemical Co., Ltd.), 2 g of a photopolymerization initiator (product name: Darocur TPO) and 10 g of a methyl ethyl ketone (MEK) solvent. The coating solution was bar coated on a PET releasing film. This was dried for 2 minutes at 60° C., and then irradiated by black UV with irradiation intensity of 600 mJ/cm$^2$ under nitrogen atmosphere to obtain a protective film having a thickness of 25 μm.

Example 5

Protective Film
A coating solution was prepared by mixing 50 g of trimethylolpropane triacrylate (TMPTA), 20 g DPCA120 (Nippon Kayaku Co., Ltd., caprolactone-modified hexafunctional acrylate, elongation measured in accordance with ASTM D638 12%, Mw 1,950), 30 g of PU3400 (Miwon Commercial Co., Ltd., ethylene oxide-modified trifunctional acrylate, elongation measured in accordance with ASTM D638 20%, Mw 2,500), 0.2 g of a porphyrin-based dye having a maximum absorption wavelength of 593 nm, 2 g of a photopolymerization initiator (product name: Darocur TPO) and 10 g of a methyl ethyl ketone (MEK) solvent. The coating solution was bar coated on a PET releasing film. This was dried for 2 minutes at 60° C., and then irradiated by black UV with irradiation intensity of 200 mJ/cm$^2$ under nitrogen atmosphere to obtain a protective film having a thickness of 25 μm.

Surface Layer
A coating solution was prepared by mixing 70 g of pentaerythritol tri(tetra)acrylate (PETA), 30 g of Ta604AU, 2 g of a photopolymerization initiator (product name: Darocur TPO) and 100 g of a methyl ethyl ketone (MEK) solvent. The coating solution was bar coated on the half-cured polarizer protective film to a thickness of 2 μm. This was dried for 2 minutes at 60° C., and then irradiated by black UV with irradiation intensity of 600 mJ/cm$^2$ under nitrogen atmosphere to obtain a protective film having a total thickness of 27 μm.

Comparative Example 1

A coating solution was prepared by mixing 50 g of trimethylolpropane triacrylate (TMPTA), 50 g of EB1290

(SK Cytec Co., Ltd., hexafunctional urethane acrylate, elongation measured in accordance with ASTM D638 0%, Mw 1,000), 2 g of a photopolymerization initiator (product name: Darocur TPO), 0.2 g of a dye PD-319 (Mitsui Chemical Inc.) and 10 g of a methyl ethyl ketone (MEK) solvent. The coating solution was bar coated on a PET releasing film. This was dried for 2 minutes at 60° C., and then irradiated by black UV with irradiation intensity of 200 mJ/cm$^2$ under nitrogen atmosphere to obtain a protective film having a thickness of 25 μm.

Comparative Example 2

A composition was prepared by mixing 100 g of poly(methyl methacrylate) (PMMA) that is a thermoplastic resin, 0.2 g of a porphyrin-based dye having a maximum absorption wavelength of 593 nm, and 100 g of a MEK solvent, and the coating solution was bar coated on a PET releasing film. Heat was applied thereto for 5 minutes at 90° C. to obtain a protective film having a thickness of 25 μm.

Comparative Example 3

A coating solution was prepared by mixing 50 g of pentaerythritol tri(tetra)acrylate, 50 g of hexafunctional urethane acrylate, 0.5 g of a light absorbent PD-319 (Mitsui Chemical Inc.), 5 g of a photopolymerization initiator Irgacure 184 and 100 g of a methyl ethyl ketone (MEK) solvent. The coating solution was coated on a TAC film having a thickness of 60 μm to a thickness of 3 μm, and the result was dried for 2 minutes at 60° C. and then cured with approximately 200 mJ/cm$^2$ using a mercury lamp.

EXPERIMENTAL EXAMPLE

Experimental Examples 1 to 5

The protective films prepared in Examples 1 to 5 were each adhered through lamination with a PVA film using an acryl-based adhesive so that the thickness of the adhesive layer became approximately 1 μm, and the PET releasing film was peeled off. On the other side of the PVA, TAC having a thickness of 40 μm was adhered in the same manner to prepare a polarizing plate.

Comparative Experimental Examples 1 and 2

The protective films prepared in Comparative Examples 1 and 2 were each adhered through lamination with a PVA film using an acryl-based adhesive so that the thickness of the adhesive layer became approximately 1 μm, and the PET releasing film was peeled off. On the other side of the PVA, TAC having a thickness of 40 μm was adhered in the same manner to prepare a polarizing plate.

Comparative Experimental Example 3

A polarizing plate was prepared in the same manner as in Experimental Examples 1 to 5 except that, in protective film prepared in Comparative Example 3, the TAC film was attached to the PVA film side. The protective film prepared in the comparative example 3 does not include a releasing film, and a separate peel-off process was not carried out.

<Measurement Method>

1) Thickness
The thickness was measured using a digital micrometer.
2) Transmittance
Transmittance in a 300 nm to 800 nm wavelength was measured with an integrating sphere type using a UV-VIS-NIR spectrometer (Solidspec-3700, SHIMADZU Corporation).
3) Pencil Hardness
Using a pencil hardness measuring device, hardness without scratches after going back and forth 5 times under a 500 g load was identified on the film surface in accordance with the measurement standard JIS K5400.
4) Scratch Resistance
For the coating layer surface of the film, a maximum load not causing scratches after applying a certain load to Steel wool #0000 and rubbing 10 times by going back and forth was identified.
5) Curl Property
Each of the polarizing plates was cut into 10 cm×10 cm, stored for 24 hours, and located on a plane, and an average distance value of one side of each edge separated from the plane was measured.
6) Cylindrical Bend Test
After inserting and winding each of the polarizing plates in a cylindrical mandrel having a diameter of 5 mm, crack occurrences were determined, and it was evaluated as OK when cracks did not occur, and NG when cracks occurred.

Results of the physical property measurement results are shown in the following Table 1.

TABLE 1

| | Experimental Example 1 | Experimental Example 2 | Experimental Example 3 | Experimental Example 4 | Experimental Example 5 | Comparative Experimental Example 1 | Comparative Experimental Example 2 | Comparative Experimental Example 3 |
|---|---|---|---|---|---|---|---|---|
| Polarizing Plate Thickness (μm) | 91 | 90 | 91 | 91 | 93 | 91 | 90 | 131 |
| 594 nm Transmittance (%) | 5.2 | 4.9 | 5.0 | 4.9 | 5.0 | 2.7 | 4.6 | 42.7 |
| 493 nm Transmittance (%) | 42.3 | 42.4 | 42.3 | 33.5 | 42.5 | 41.7 | 42.3 | 42.7 |
| Pencil Hardness | 3H | 2H | 3H | 3H | 3H | 3H | 2B | 2H |
| Scratch Resistance | 500 g | 300 g | 400 g | 500 g | 500 g | 500 g | 50 g | 200 g |
| Curl Property (mm) | 0.7 | 0.3 | 0.3 | 0.5 | 0.5 | 28.5 | 0.1 | 0.3 |
| Bend Test | OK | OK | OK | OK | OK | NG | OK | OK |

As shown in Table 1, Experimental Examples 1 to 5 according to one embodiment of the present specification exhibited excellent effects in all of the pencil hardness, the scratch resistance, the curl property and the bend tests compared to Comparative Experimental Examples 1 to 3.

In addition, it was seen that Experimental Examples 1 to 5 according to one embodiment of the present specification were able to obtain a thinner plate without a separate substrate between the adhesive layer and the light absorption layer.

Furthermore, it was seen that Experimental Examples 1 to including a photocurable functional group had significant effects in pencil hardness compared to Comparative Experimental Example 3 including a thermoplastic resin.

Hereinbefore, preferred examples of the present specification have been described, however, the present disclosure is not limited thereto, and various modification may be made within the patent claims and detailed descriptions of the disclosure, and these also belong to the scope of the present disclosure.

The invention claimed is:

1. A polarizer protective film comprising:
a photocurable resin including a multifunctional acrylate-based monomer and an acrylate-based oligomer having an elongation of 5% to 200%; and
a total amount of 0.1 to 1 part by weight of a sole dye or pigment based on 100 parts by weight of the photocurable resin, wherein the sole dye or pigment consists of:
a) a dye or pigment having a maximum absorption wavelength in a range of 580 nm to 610 nm, or
b) a combination of a) and a dye or pigment having a maximum absorption wavelength in a range of 480 nm to 510 nm;
wherein the polarizer protective film has an average light transmittance of 50% or greater in a 400 nm to 550 nm wavelength region, and a pencil hardness of H or greater under a 500 g load.

2. The polarizer protective film of claim 1, further comprising an adhesive layer provided on one surface of the polarizer protective film.

3. The polarizer protective film of claim 1, wherein the dye or the pigment is a porphyrin derivative compound, a cyanine derivative compound or a squarylium derivative compound.

4. The polarizer protective film of claim 1, wherein the photocurable resin includes one or more types selected from the group consisting of a multifunctional acrylate-based oligomer and a multifunctional acrylate-based elastic polymer.

5. The polarizer protective film of claim 1, wherein the multifunctional acrylate-based monomer includes one or more of hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tetraacrylate (PETA) and dipentaerythritol hexaacrylate (DPHA).

6. The polarizer protective film of claim 1, wherein the acrylate-based oligomer is an acrylate-based oligomer modified with one or more types of ethylene oxide, propylene oxide or caprolactone.

7. The polarizer protective film of claim 1, wherein, in the photocurable resin, the multifunctional acrylate-based monomer and the acrylate-based oligomer having an elongation of 5% to 200% are cured in a weight ratio of 2:8 to 8:2.

8. The polarizer protective film of claim 1, further comprising a photopolymerization initiator.

9. The polarizer protective film of claim 1, which has an average light transmittance of 30% or less in a 580 nm to 610 nm wavelength region.

10. The polarizer protective film of claim 5, which has an average light transmittance of less than 70% in a 480 nm to 510 nm wavelength region.

11. The polarizer protective film of claim 1, which has a maximum absorption wavelength in a 590 nm to 600 nm range.

12. The polarizer protective film of claim 1, further comprising a surface layer provided on one surface of the polarizer protective film.

13. The polarizer protective film of claim 12, wherein a thickness of the surface layer is 0.01 to 1 with respect to a thickness of the polarizer protective film.

14. A polarizing plate comprising:
a polarizer; and
the polarizer protective film of claim 1 provided on at least one surface of the polarizer as a protective film.

15. A liquid crystal display device comprising:
a backlight unit;
a liquid crystal panel provided on one side of the backlight unit, the liquid crystal panel comprising a color filter; and
the polarizing plate of claim 14 provided between the backlight unit and the liquid crystal panel.

16. The polarizer protective film of claim 1, wherein the dye or pigment having a maximum absorption wavelength in a range of 580 nm to 610 nm is present in an amount of 0.1 to 0.5 part by weight based on 100 parts by weight of the photocurable resin.

17. The polarizer protective film of claim 1, wherein the sole dye or pigment consists of:
the dye or pigment having a maximum absorption wavelength in a range of 580 nm to 610 nm in an amount of 0.1 to 0.5 part by weight based on 100 parts by weight of the photocurable resin; and
the dye or pigment having a maximum absorption wavelength in a range of 480 nm to 510 nm in an amount of 0.01 to 0.5 part by weight based on 100 parts by weight of the photocurable resin.

18. A method for preparing the polarizer protective film of claim 1, the method comprising:
coating on a releasing film a composition including the photocurable resin including the multifunctional acrylate-based monomer, the acrylate-based oligomer having an elongation of 5% to 200%, and the total amount of 0.1 to 1 part by weight of the sole dye or pigment based on 100 parts by weight of the photocurable resin, wherein the sole dye or pigment consists of:
a) the dye or pigment having a maximum absorption wavelength of 580 nm to 610 nm, or
b) the combination of a) and the dye or pigment having a maximum absorption wavelength in a range of 480 nm to 510 nm;
forming the polarizer protective film by curing the composition; and
peeling off the releasing film from the polarizer protective film,
the polarizer protective film having an average light transmittance of 50% or greater in a 400 nm to 550 nm wavelength region, and a pencil hardness of H or greater under a 500 g load.

19. The method for preparing the polarizer protective film of claim 18, wherein the composition has changes in the transmittance, which is measured by the following Equation 1, that is less than 5%:

$$\text{changes in transmittance} = \frac{\begin{pmatrix} \text{average light transmittance in} \\ \text{650 nm to 710 nm region} \\ \text{wavelength before } UV \text{ curing} - \\ \text{average light transmittance in 650 nm to} \\ \text{710 nm region wavelength after } UV \text{ curing} \end{pmatrix}}{\text{average light transmittance in 650 nm to 710 nm region wavelength before } UV \text{ curing}} \times 100 \quad [\text{Equation 1}]$$

wherein in Equation 1, the ultraviolet (UV) curing means coating the composition including the sole dye or pigment on a transparent substrate, and curing the result by exposure to ultraviolet rays having a 290 nm to 320 nm wavelength with an irradiation amount of 20 mJ/cm² to 600 mJ/cm².

* * * * *

UNITED STATES PATENT AND TRADEMARK OFFICE
CERTIFICATE OF CORRECTION

PATENT NO. : 11,003,017 B2  
APPLICATION NO. : 15/744037  
DATED : May 11, 2021  
INVENTOR(S) : Hanna Lee et al.

Page 1 of 1

It is certified that error appears in the above-identified patent and that said Letters Patent is hereby corrected as shown below:

In the Claims

At Column 24, Lines 6-8, please replace Claim 10 with the following:
10. The polarizer protective film of claim 1, which has an average light transmittance of less than 70% in a 480 nm to 510 nm wavelength region.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*